US012620671B2

(12) United States Patent
Okura et al.

(10) Patent No.: US 12,620,671 B2
(45) Date of Patent: May 5, 2026

(54) MANUFACTURING APPARATUS OF MANUFACTURING ELECTROCHEMICAL CELL

(71) Applicant: TOYOTA JIDOSHA KABUSHIKI KAISHA, Toyota (JP)

(72) Inventors: Toshinori Okura, Toyota (JP); Hideto Mori, Nisshin (JP); Shinji Suzuki, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 774 days.

(21) Appl. No.: 17/948,741

(22) Filed: Sep. 20, 2022

(65) Prior Publication Data

US 2023/0163404 A1　May 25, 2023

(30) Foreign Application Priority Data

Nov. 22, 2021　(JP) ................................. 2021-189535

(51) Int. Cl.
H01M 50/30　(2021.01)
H01M 10/04　(2006.01)
(52) U.S. Cl.
CPC ......... H01M 50/30 (2021.01); H01M 10/049 (2013.01)
(58) Field of Classification Search
CPC ...... H01M 50/30; H01M 10/049; H01M 8/18; H01M 10/04; H01M 10/058; H01M 10/28; H01M 50/655; H01M 10/0404; B29C 51/10; B01D 53/263; Y02P 70/50; Y10T 29/49108
See application file for complete search history.

(56) References Cited

U.S. PATENT DOCUMENTS

| | | | |
|---|---|---|---|
| 9,692,081 B2 * | 6/2017 | Fukatsu | ............ H01M 10/0481 |
| 10,320,014 B2 * | 6/2019 | Friesen | ................ B01D 53/263 |
| 2013/0247364 A1 | 9/2013 | Fukatsu | |
| 2016/0254523 A1 | 9/2016 | Tsukui et al. | |

FOREIGN PATENT DOCUMENTS

| | | |
|---|---|---|
| JP | 2013-058377 A | 3/2013 |
| JP | 2018-026297 A | 2/2018 |
| JP | 2018-106850 A | 7/2018 |
| JP | 2019-033043 A | 2/2019 |
| JP | 2019-153538 A | 9/2019 |
| KR | 10-2010-0111312 A | 10/2010 |
| KR | 10-2013-0108132 A | 10/2013 |
| KR | 10-2016-0068929 A | 6/2016 |
| WO | 2009/096602 A1 | 8/2009 |

* cited by examiner

*Primary Examiner* — Donghai D Nguyen
(74) *Attorney, Agent, or Firm* — Oliff PLC

(57) ABSTRACT

A manufacturing apparatus includes a chamber, a pressure reducing device, and a return pipe. The pressure reducing device is configured to reduce the pressure in the chamber. The return pipe includes a first opening, a conduit, and a second opening. The first opening and the second opening are respectively and independently open to the interior of the chamber. The first opening is connected to an exterior body. The conduit connects the first opening and the second opening. The conduit is configured to once draw gas in the exterior body out of the chamber when the pressure in the chamber is reduced, and return the drawn gas into the chamber.

11 Claims, 9 Drawing Sheets

MANUFACTURING APPARATUS OF MANUFACTURING ELECTROCHEMICAL CELL

CROSS-REFERENCE TO RELATED APPLICATION

This application claims priority to Japanese Patent Application No. 2021-189535 filed on Nov. 22, 2021, incorporated herein by reference in its entirety.

BACKGROUND

1. Technical Field

The disclosure relates to a manufacturing apparatus, and a method of manufacturing electrochemical cells.

2. Description of Related Art

Japanese Unexamined Patent Application Publication No. 2018-106850 (JP 2018-106850 A) discloses an injection device and an injecting method that can improve the production efficiency of power storage modules.

SUMMARY

Generally, electrochemical cells (which can be abbreviated to "cells") are manufactured by enclosing, for example, power generating elements and electrolyte in an exterior body. During use of the cells, gas may be generated in the exterior body due to deterioration of the electrolyte, for example. As the gas is generated, the internal pressure in the exterior body can be increased. Considering later gas generation, it is desirable to reduce gas in the exterior body as much as possible during the manufacturing stage. Thus, the pressure in the exterior body may be reduced. For example, the pressure in the exterior body may be reduced by, for example, a vacuum pump, etc. After the pressure (degree of pressure reduction) in the exterior body reaches a target value, the exterior body is sealed.

In some cases, an exterior body having low rigidity is used. For example, a sheet-like exterior body, such as a metal foil laminate film, may be used. When the rigidity of the exterior body is low, the exterior body can be pushed by the external pressure and deformed when the pressure in the exterior body is reduced. With the exterior body thus deformed, a gas channel can be blocked. If the gas channel is blocked, there is a possibility that the target degree of pressure reduction in the exterior body has not been reached even if a value indicated by a pressure gauge reaches a target value.

The disclosure provides a manufacturing apparatus and a method of manufacturing an electrochemical cell, which guarantee the internal pressure in an exterior body by reducing blockage of a gas channel when the pressure in the exterior body is reduced.

A manufacturing apparatus according to a first aspect of the disclosure is a manufacturing apparatus for manufacturing an electrochemical cell having an exterior body under reduced pressure. The manufacturing apparatus includes a chamber, a pressure reducing device, and a return pipe. The pressure reducing device is configured to reduce a pressure in the chamber. The return pipe includes a first opening, a conduit, and a second opening. The first opening and the second opening are respectively and independently open to an interior of the chamber. The first opening is configured to be connected to the exterior body. The conduit connects the first opening and the second opening. The conduit is configured to once draw a gas in the exterior body out of the chamber when the pressure in the chamber is reduced, and then return the gas into the chamber.

In the manufacturing apparatus according to the first aspect, the return pipe may include a plurality of return pipes that are independent of each other. Each of the return pipes may include the first opening, the conduit, and the second opening.

The manufacturing apparatus according to the first aspect may further include a pressure gauge. The pressure gauge may be connected to the conduit.

The manufacturing apparatus according to the first aspect may further include a flow meter. The flow meter may be connected to the conduit.

The manufacturing apparatus according to the first aspect may further include a sealing device. The sealing device may be configured to seal the exterior body in the chamber.

A method of manufacturing an electrochemical cell according to a second aspect of the disclosure includes preparing the manufacturing apparatus according to the first aspect of the disclosure, preparing a workpiece by enclosing a power generating element in the exterior body, placing the workpiece in the chamber, connecting the exterior body and the first opening, and reducing a pressure in the chamber, to reduce a pressure in the exterior body via the return pipe.

In the method according to the second aspect, in preparing the manufacturing apparatus, the manufacturing apparatus including a plurality of return pipes that are independent of each other may be prepared. In preparing the workpiece, a cell module including a plurality of electrochemical cells may be prepared as the workpiece. The electrochemical cells may respectively and independently include internal spaces. In connecting the exterior body and the first opening, the return pipes that are separate from each other may be respectively connected to the internal spaces.

In the method according to the second aspect, in preparing the manufacturing apparatus, the manufacturing apparatus including a pressure gauge may be prepared. In reducing the pressure in the exterior body, the pressure in the exterior body may be reduced such that a value indicated by the pressure gauge becomes equal to or lower than a reference value.

In the method according to second aspect, in preparing the manufacturing apparatus, the manufacturing apparatus including a flow meter may be prepared. In reducing the pressure in the exterior body, the pressure in the exterior body may be reduced such that an integrated value of measurement values of the flow meter is equal to or larger than a reference value after the pressure stops being reduced.

The method according to the second aspect may further include injecting an electrolyte into the exterior body, through an injection port formed in the exterior body. In connecting the exterior body and the first opening, the first opening of the return pipe may be connected to the injection port.

The method according to the second aspect, the exterior body may contain at least one type selected from the group consisting of a metal foil and a metal foil laminate film.

In the method, in preparing the workpiece, a bipolar cell module may be prepared as the workpiece.

The method according to the second aspect may further include sealing the exterior body under reduced pressure.

In the following, an embodiment of this disclosure (which can be abbreviated to "this embodiment") and an example of this disclosure (which can be abbreviated to "Example") will be described. However, the technical scope of this disclosure is not limited to this embodiment and Example.

BRIEF DESCRIPTION OF THE DRAWINGS

Features, advantages, and technical and industrial significance of exemplary embodiments of the disclosure will be described below with reference to the accompanying drawings, in which like signs denote like elements, and w % herein.

DETAILED DESCRIPTION OF EMBODIMENTS

Definition of Terms, Etc

Figure 1:
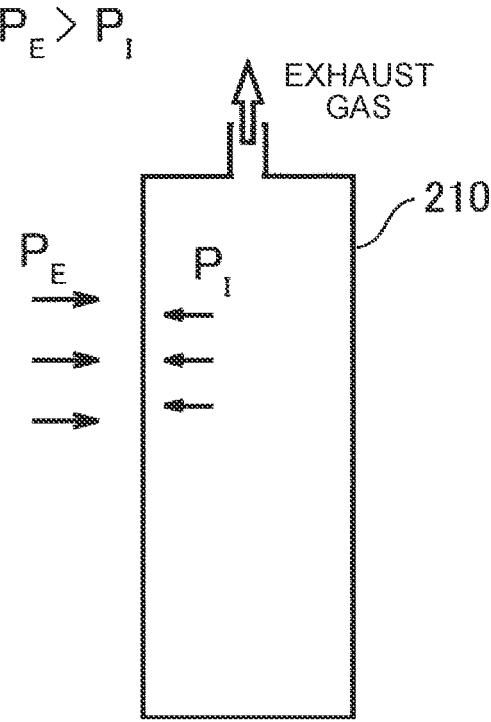
FIG. 1 is a first conceptual diagram of a reduced pressure condition.

In this specification, the terms "comprising", "including", "having", and their variations (e.g., "be comprised of") are in open-ended form. The open-ended form may or may not further include additional elements in addition to the essential elements. The term "consisting of" is in closed form. However, even the closed form does not exclude additional elements that are normally incidental impurities or irrelevant to the disclosed technology. The term "consisting substantially of . . . " is in semi-closed form. In the semi-closed form, addition of elements having substantially no influence on the basic and novel characteristics of the disclosed technology is permitted.

In this specification, expressions such as "may do" and "can do" are used in the permissive sense "have the possibility of doing", rather than in the obligatory sense "must do".

In this specification, the order of execution of a plurality of steps, actions, and operations included in various method is not limited to the order of description unless otherwise noted. For example, two or more steps may be executed at the same time. For example, two or more steps may be executed before or after each other.

Geometric terms (e.g., "parallel", "perpendicular". "orthogonal", etc.) in this specification should not be interpreted in a strict sense. For example, "parallel" may deviate somewhat from "parallel" in a strict sense. The geometric terms in this specification can include, for example, tolerances, errors, etc. in design, operation, manufacturing, etc. The dimensional relationships in each figure may not match the actual dimensional relationships. In some cases, the dimensional relationships (length, width, thickness, etc.) in each figure are changed to aid understanding of the disclosed technology. In addition, some configurations may be omitted.

In this specification, "electrochemical cell" denotes a single device that converts chemical energy into electrical energy. The electrochemical cells include primary batteries and secondary batteries. The electrochemical cells include lithium-ion batteries and nickel-metal-hydride batteries. The lithium-ion batteries include liquid batteries and all solid-state batteries. In this specification. "cell module" denotes a collection of a plurality of electrochemical cells. The electrochemical cells may or may not be electrically connected to each other. The electrochemical cells may form a series circuit or a parallel circuit.

In this specification, the "degree of pressure reduction" denotes the magnitude of the pressure of gas remaining in an exterior body after pressure reduction. The degree of pressure reduction can also be referred to as "degree of vacuum".

SUMMARY OF EMBODIMENT

Initially, the summary of this embodiment will be described. The operation mechanism of this specification includes presumption. The operation mechanism does not limit the embodiment.

1. A manufacturing apparatus can manufacture an electrochemical cell in which the pressure in an exterior body is reduced. The manufacturing apparatus includes a chamber, a pressure reducing device, and a return pipe. The pressure reducing device is configured to reduce the pressure in the chamber. The return pipe includes a first opening, a conduit, and a second opening. The first opening and the second opening are respectively and independently open to the interior of the chamber. The first opening is configured to be connected to the exterior body. The conduit connects the first opening and the second opening. The conduit extends to once draw gas in the exterior body out of the chamber when the pressure in the chamber is reduced, and then return the drawn gas into the chamber.

FIG. 1 is a first conceptual diagram of a reduced pressure condition. As the gas in the exterior body 210 is discharged, the internal pressure $P_I$ in the exterior body 210 becomes lower than the external pressure $P_E$. Namely, the inside of the exterior body 210 is brought into a negative-pressure state relative to the ambient atmosphere. The internal space of the exterior body 210 may be crushed by the external pressure $P_E$, which may result in blockage of a gas channel.

Figure 2:
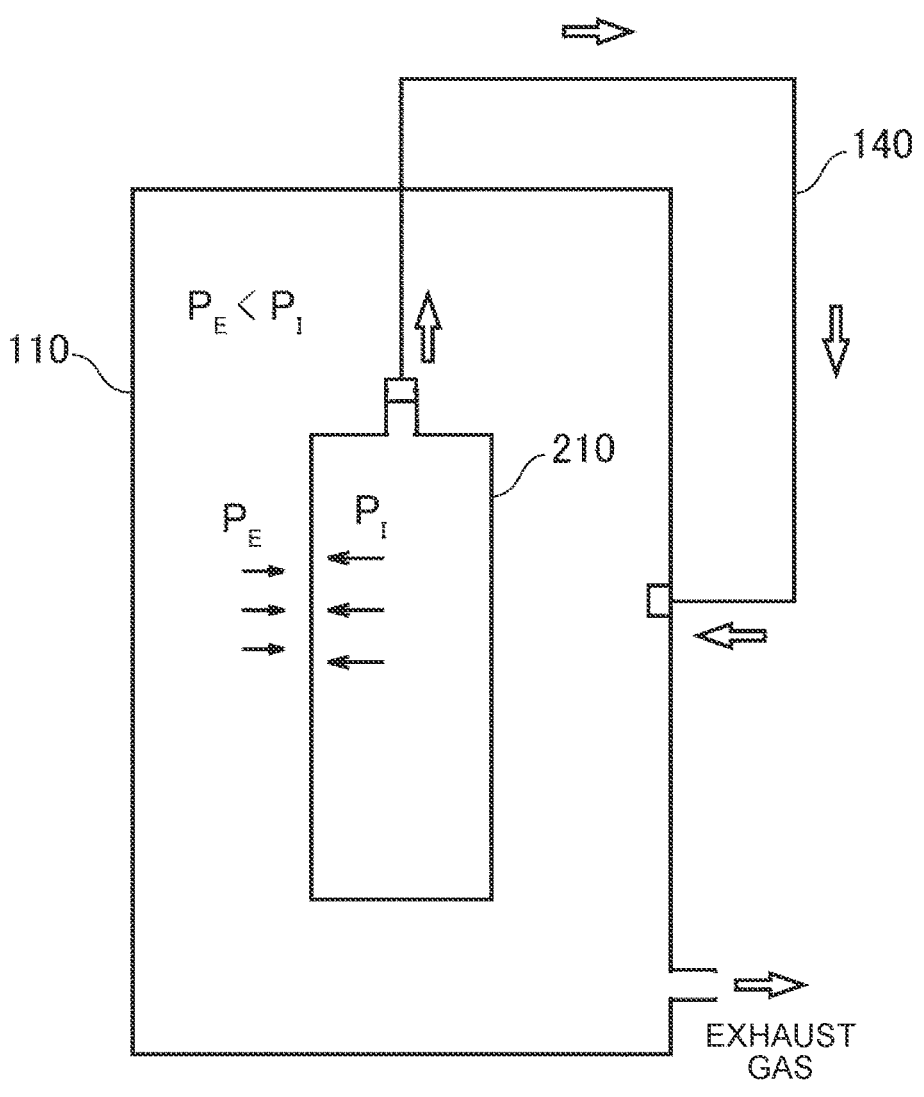
FIG. 2 is a second conceptual diagram of a reduced pressure condition.

FIG. 2 is a second conceptual diagram of a reduced pressure condition. In FIG. 2, the white arrows indicate gas flow. In the manufacturing apparatus of item "1" above, the gas in the exterior body 210 can be discharged via the return pipe 140. As the pressure in the chamber 110 is reduced, the pressure of the chamber 110 (external pressure $P_E$) is reduced. In the return pipe 140, a pressure loss can be generated. As a result, the internal pressure $P_I$ in the exterior body 210 can become larger than the external pressure $P_E$. Namely, the inside of the exterior body 210 can be brought into a positive-pressure state, relative to the ambient atmosphere (atmosphere in the chamber 110). As the positive-pressure state is maintained during pressure reduction, the internal space of the exterior body 210 is considered to be less likely or unlikely to be crushed by the external pressure $P_E$. Namely, blockage of the gas channel is considered to be less likely or unlikely to take place.

2. The manufacturing apparatus may include a plurality of return pipes. Each of the return pipes that are independent of each other includes the first opening, conduit, and second opening.

The manufacturing apparatus of item "1" above can produce a single cell, for example. The manufacturing apparatus of item "2" above can produce a cell module. The manufacturing apparatus of item "2" above is considered suitable for the manufacture of cell modules.

Figure 3:
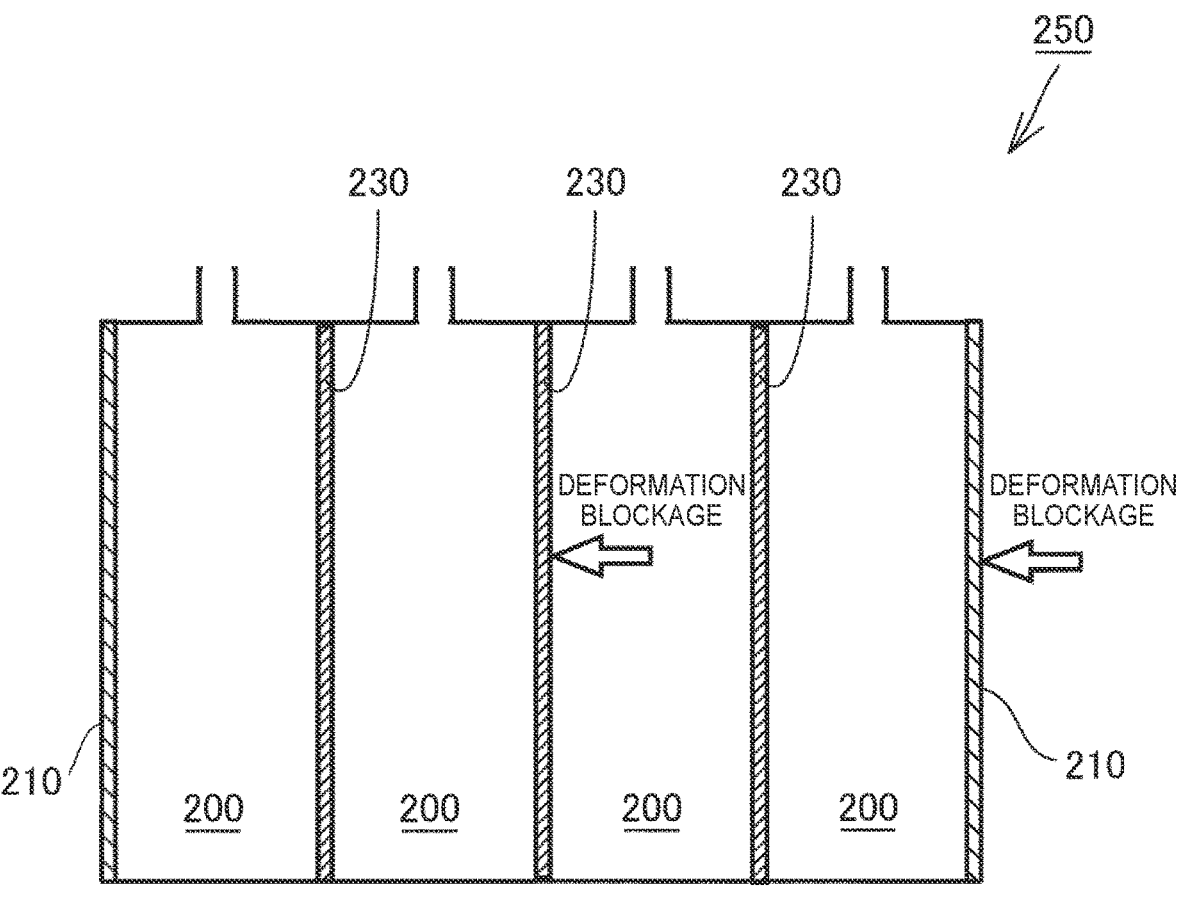
FIG. 3 is a conceptual diagram showing one example of a cell module.

FIG. 3 is a conceptual diagram showing one example of a cell module. The cell module 250 includes partitions 230. The partition 230 divides adjacent cells 200 from each other. When any gas channel is blocked due to deformation of the exterior body 210 in an outer cell 200, the occurrence of the blockage can be detected by exterior appearance. The white arrows in FIG. 3 indicate one example of the deformation direction. When any gas channel is blocked due to deformation of the partition 230 in an inner cell 200, for example, it is difficult to detect the occurrence of the blockage by exterior appearance.

By connecting separate return pipes to the individual cells, it is considered possible to reduce the pressure in each of the cells while keeping the cell in the positive-pressure state. Thus, blockage of gas channels in the inner cells is considered to be reduced.

In the manufacturing apparatus of item "2" above, the object of which the pressure is reduced is a single chamber. Thus, the pressures in a plurality of cells can be reduced at the same time by a single pressure reducing device.

3. The manufacturing apparatus may further include a pressure gauge. The pressure gauge is connected to the conduit.

The pressure gauge may be used to check the degree of pressure reduction of each of the cells.

4. The manufacturing apparatus may further include a flow meter. The flow meter is connected to the conduit.

For example, the total amount of the gas discharged may be obtained by integrating the measurement values of the flow meter. For example, the degree of pressure reduction in the individual cells may be determined from the total amount of the gas discharged and the internal space (volume) of the exterior body.

5. The manufacturing apparatus may further include a sealing device. The sealing device may be configured to seal the exterior body in the chamber.

6. A method of manufacturing an electrochemical cell includes the following steps (a) to (e).

(a) Prepare the manufacturing apparatus of item "1" above.

(b) Prepare a workpiece by enclosing power generating elements in the exterior body.

(c) Place the workpiece in the chamber.

(d) Connect the exterior body to the first opening.

(e) Reduce the pressure in the chamber, thereby to reduce the pressure in the exterior body via the return pipe.

The manufacturing apparatus of item "1" above can be used in the procedure of item "6" above, for example.

7. In step (a) above, a manufacturing apparatus including a plurality of independent return pipes, for example, may be prepared. In step (b) above, a cell module including a plurality of electrochemical cells may be prepared as the workpiece. The electrochemical cells respectively and independently include internal spaces. In step (d) above, separate return pipes may be connected to the respective internal spaces.

In the manufacturing method of item "7" above, the cell module can be produced. The cell module may be of bipolar type or monopolar type. In the bipolar type, each electrode has two polarities. For example, the front side of the electrode is a positive electrode, and the rear side is a negative electrode. The electrode can also be referred to as "bipolar electrode". In the monopolar type, each electrode has a single polarity. Namely, the electrode is a positive electrode or a negative electrode.

8. In step (a) above, a manufacturing apparatus including a pressure gauge, for example, may be prepared. In step (e) above, the pressure in the exterior body may be reduced so that the value indicated by the pressure gauge becomes equal to or lower than a reference value.

For example, the degree of pressure reduction may be checked by the pressure gauge.

9. In step (a) above, a manufacturing apparatus including a flow meter may be prepared. In step (e) above, the pressure in the exterior body may be reduced so that the integrated value of the measurement values of the flow meter is equal to or larger than a reference value after the pressure stops being reduced.

For example, the degree of pressure reduction may be checked by the flow meter. For example, the degree of pressure reduction may be checked by both the pressure gauge and the flow meter.

10. An injection port may be formed in the exterior body. Electrolyte can be injected into the exterior body via the injection port. In step (d) above, the first opening of the return pipe may be connected to the injection port.

For example, gas may be discharged from the injection port of the exterior body.

11. The exterior body may include at least one type selected from the group consisting of metal foil, and metal foil laminate film.

The metal foil and metal foil laminate film can have low rigidity. The manufacturing method of item "6" above is considered suitable for the case where the rigidity of the exterior body is low.

12. In step (b) above, a bipolar cell module may be prepared as the workpiece.

The manufacturing method of item "7" above is considered suitable for the manufacture of bipolar cell modules.

13. The method of manufacturing the electrochemical cell may further include step (f) below.

(f) Seal the exterior body under reduced pressure.

DETAILS OF THE EMBODIMENT

Next, details of the embodiment will be described.

Manufacturing Apparatus

Figure 4:
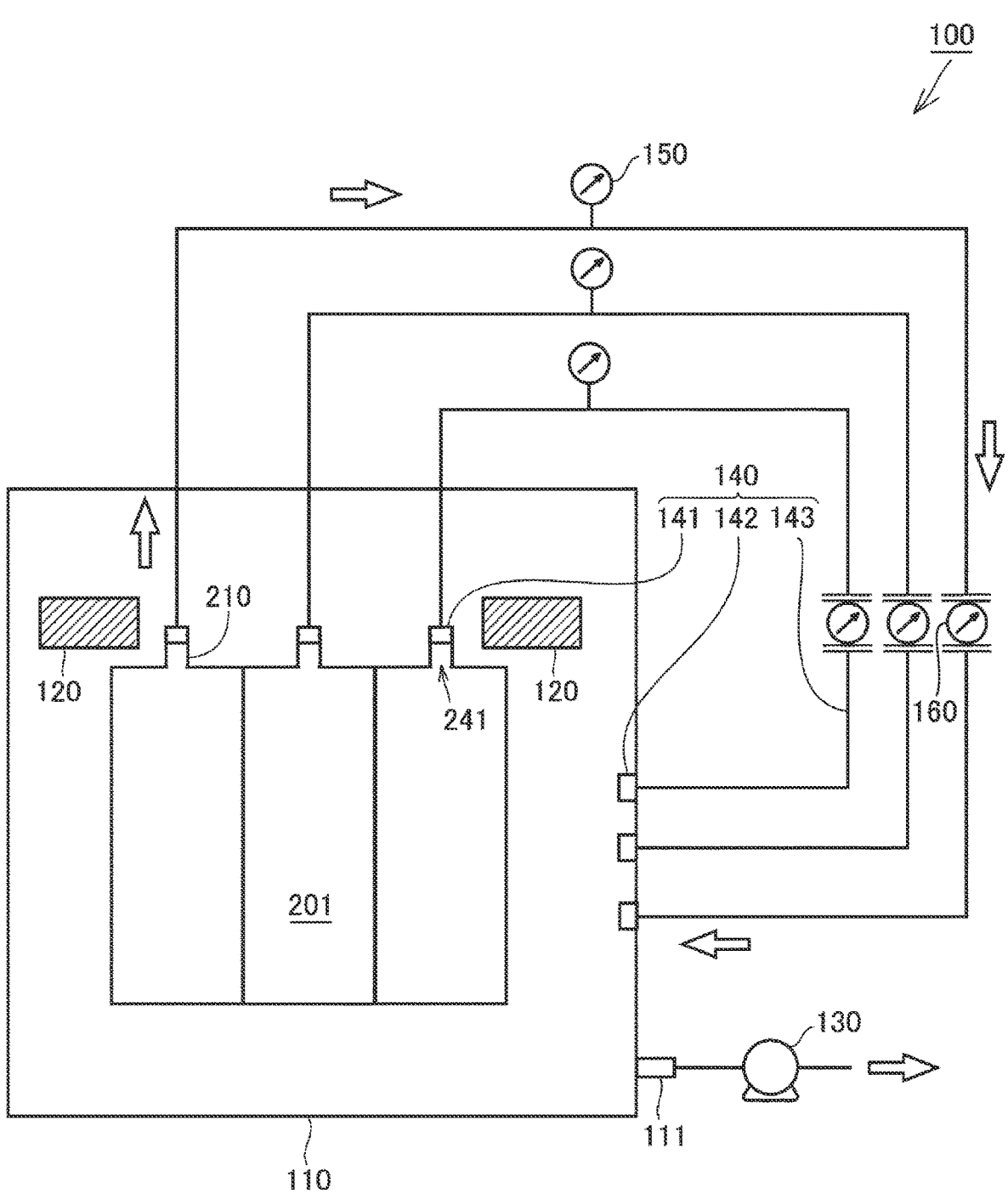
FIG. 4 is a conceptual diagram showing one example of a manufacturing apparatus of the embodiment.

FIG. 4 is a conceptual diagram showing one example of the manufacturing apparatus of this embodiment. The "manufacturing apparatus of this embodiment" can be simply referred to as "the manufacturing apparatus". The manufacturing apparatus 100 includes a chamber 110, a pressure reducing device 130, and return pipes 140. The manufacturing apparatus 100 may further include, for example, sealing devices 120, pressure gauges 150, flow meters 160, etc.

The chamber 110 can provide a stable sealed space under a reduced pressure condition. The chamber 110 may be, for example, a metal container. The chamber 110 may include an exhaust port 111, for example. The exhaust port 111 can be connected to the pressure reducing device 130. For example, a stage, holder, or the like (not shown in FIG. 4) may be provided in the chamber 110. The workpiece 201 may be held by the stage, holder, or the like.

The sealing device 120 may be configured to seal the exterior body 210, inside the chamber 110, for example. The sealing device 120 may be configured to seal the exterior body 210, outside the chamber 110, for example. The sealing device 120 can seal the exterior body 210 by any given method. The sealing device 120 may include, for example, a thermal welding device, ultrasonic welding device, etc. The sealing device 120 may be located, for example, in the chamber 110. For example, a part of the sealing device 120 may be located in the chamber 110. For example, a portion of the sealing device 120 that actually performs sealing may be located in the chamber 110. The portion that actually performs sealing may include, for example, a press unit, heat bar, heat plate, ultrasonic horn, anvil, etc. The sealing device 120 may be located, for example, outside the chamber 110.

The pressure reducing device 130 may be configured to reduce the pressure in the chamber 110. The pressure reducing device 130 may include, for example, a vacuum pump, compressor, etc.

The return pipe 140 can be strong enough not to be deformed when pushed by external pressure during pressure reduction. The return pipe 140 may be made of, for example, metal. The return pipe 140 includes a first opening 141, conduit 143, and second opening 142. The first opening 141 and the second opening 142 respectively and independently open to the interior of the chamber 110. The positions of the first opening 141 and second opening 142 may be determined as desired provided that they are not the same position. The first opening 141 is configured to be connected to the exterior body 210. For example, a jig for connecting the return pipe 140 to the exterior body 210 may be attached to the first opening 141.

The conduit 143 connects the first opening 141 to the second opening 142. The first opening 141 is located at one end of the conduit 143. The second opening 142 is located at the other end of the conduit 143. In FIG. 4, the white arrows indicate flow of gas. The conduit extends to once draw the gas in the exterior body 210 out of the chamber 110 when the pressure in the chamber 110 is reduced, and then return the drawn gas into the chamber 110. Namely, when the pressure in the chamber 110 is reduced, the gas in the exterior body 210 is sucked from the first opening 141. The sucked gas passes through the conduit 143, and is released to the interior of the chamber 110 via the second opening 142. In the conduit 143, a pressure loss is considered to be generated in the conduit 143. Due to the pressure loss, the interior of the exterior body 210 can be in a positive-pressure state relative to the atmosphere in the chamber 110. The pressure in the exterior body 210, which is in the positive-pressure state, is reduced, so that blockage of the gas channel in the exterior body 210 can be reduced.

For example, the conduit 143 may have an inside diameter of 1 to 10 mm, or may have an inside diameter of 2 to 6 mm. When the inside diameter of the conduit 143 is in the range of 1 to 10 mm, a suitable pressure loss can be generated. The inside diameter of the conduit 143 may be constant or varied. The pressure loss may be generated due to change of the inside diameter. The conduit 143 may have two or more elbows. The pressure loss may occur at the elbows.

The manufacturing apparatus 100 may include a single return pipe 140. The manufacturing apparatus 100 may include two or more return pipes 140. In FIG. 4, three return pipes 140 are illustrated as one example. Each of the two or more return pipes 140, which are independent of each other, includes the first opening 141, conduit 143, and second opening 142. With the manufacturing apparatus 100 including the two or more return pipes 140, the cell module 250 can be produced. The number of the return pipes 140 can correspond to the number of the cells 200 included in the cell module 250.

The manufacturing apparatus 100 may further include a pressure gauge 150. The pressure gauge 150 is connected to the conduit 143. Depending on the target degree of pressure reduction, the pressure gauge 150 having an appropriate pressure range can be selected. The degree of pressure reduction in the exterior body 210 can be determined from the value indicated by the pressure gauge 150. When the manufacturing apparatus 100 includes two or more return pipes 140, the pressure gauge 150 may connected to each of the return pipes 140.

The manufacturing apparatus 100 may further include a flow meter 160. The flow meter 160 is connected to the conduit 143. Depending on the gas flow rate, the flow meter 160 having an appropriate flow range can be selected. The gas flow rate is measured by the flow meter 160. The integrated value of the measurement values is considered as the total amount of discharged gas. The degree of pressure reduction in the exterior body 210 can be determined from the total amount of the discharged gas and the internal space of the exterior body 210. When the manufacturing apparatus 100 includes two or more return pipes 140, the flow meter 160 may be connected to each of the return pipes 140.

Method of Manufacturing Electrochemical Cell

Figure 5:
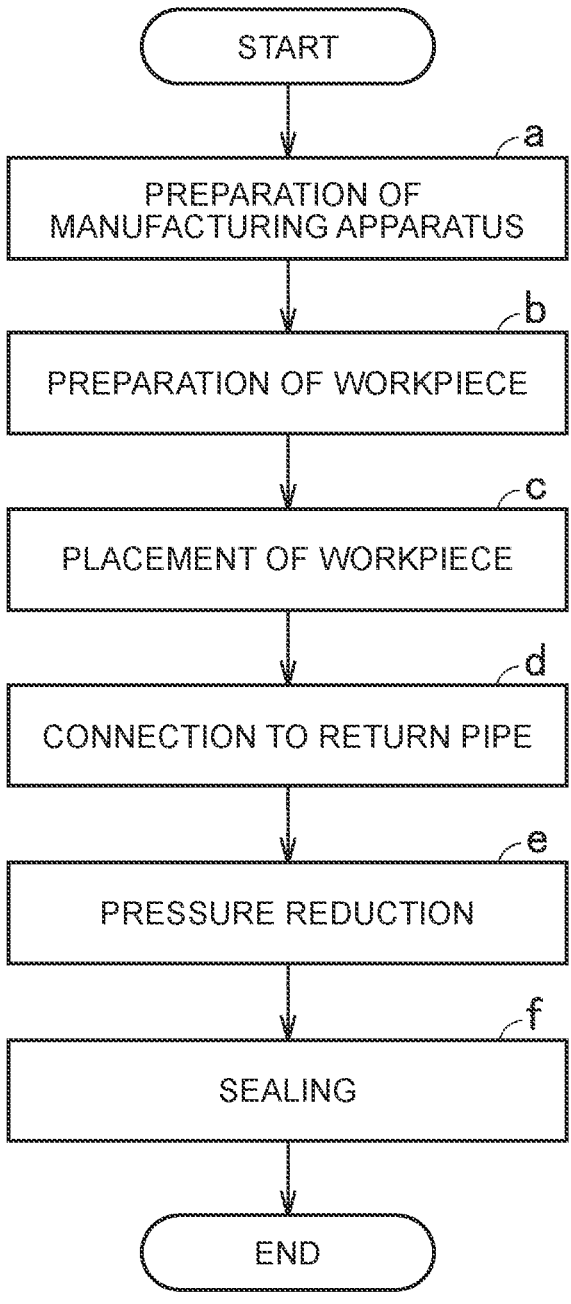
FIG. 5 is a schematic flowchart of a method of manufacturing an electrochemical cell according to the embodiment.

FIG. 5 is a schematic flowchart of a method of manufacturing an electrochemical cell according to this embodiment. In the following description, the "method of manufacturing an electrochemical cell according to this embodiment" will be briefly referred to as "the manufacturing method". The manufacturing method includes (a) preparation of manufacturing apparatus, (b) preparation of workpiece, (c) placement of workpiece, (d) connection to return pipe, and (e) pressure reduction. The manufacturing method may further include, for example, (0) sealing, etc. The order of description in FIG. 5 is mere formality. For example, the order of (a) preparation of manufacturing apparatus and (b) preparation of workpiece may be reversed.

(a) Preparation of Manufacturing Apparatus

The manufacturing method includes preparation of the manufacturing apparatus 100. The details of the manufacturing apparatus 100 have been described above.

(b) Preparation of Workpiece

The manufacturing method includes preparing the workpiece 201 by enclosing the power generating elements 220 in the exterior body 210. The workpiece 201 is so-called "pre-sealed cell". For example, a bipolar cell module may be prepared as the workpiece 201. The bipolar cell module includes a plurality of cells. The bipolar cell module may include, for example, 1 to 100 cells, or may include 10 to 50 cells, or may include 20 to 40 cells. Here, the "bipolar cell module" is simply referred to as "cell module".

Figure 6:
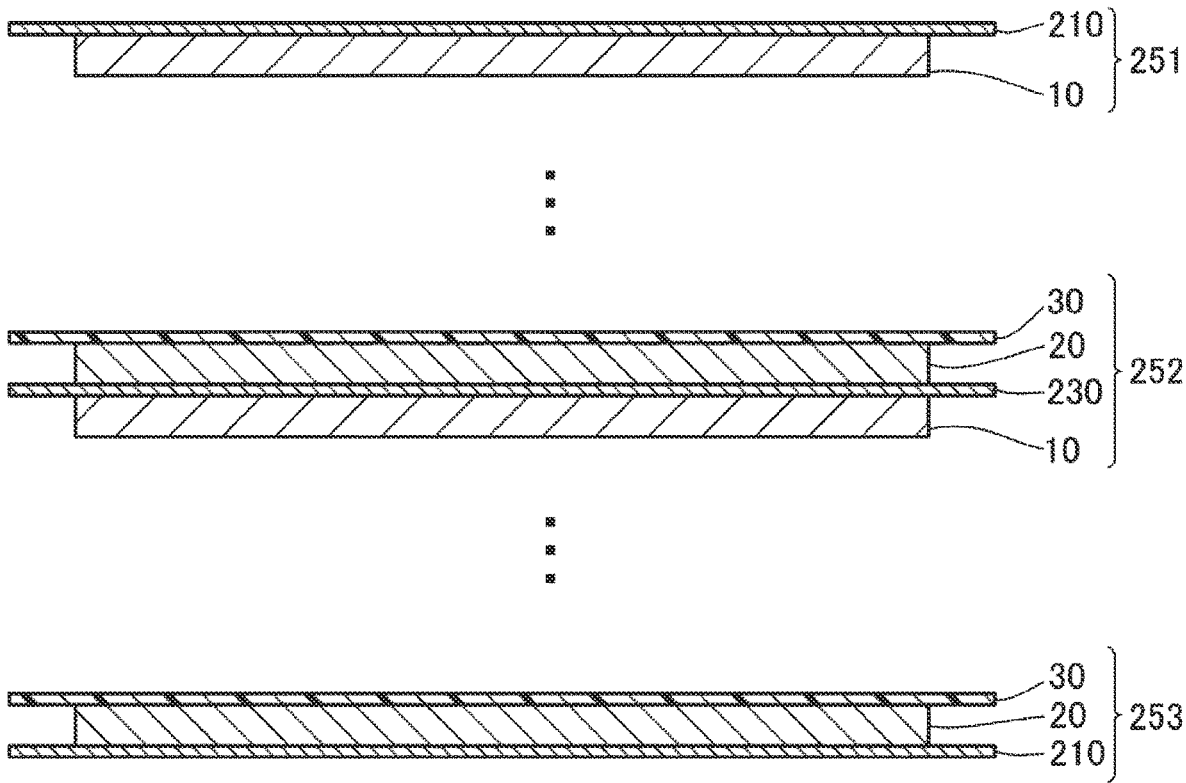
FIG. 6 is a schematic cross-sectional view of a first unit, a second unit, and a third unit in the embodiment.
Figure 6:
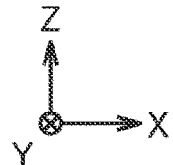

FIG. 6 is a schematic cross-sectional view of a first unit, a second unit, and a third unit in this embodiment. The first unit 251, second unit 252, and third unit 253 can constitute the cell module 250. The first unit 251 and the third unit 253 are located at opposite ends in the stacking direction (Z-axis direction) The second units 252 are stacked between the first unit 251 and the third unit 253.

The exterior body 210 is in the form of a sheet. The exterior body 210 may function as a current collector. The exterior body 210 may include at least one type selected from the group consisting of metal foil and metal foil laminate film. The metal foil laminate film can be formed by covering metal foil with a resin layer. The resin layer may include, for example, polypropylene (PP), polyethylene terephthalate (PET), etc. The metal foil may include at least one type selected from the group consisting of aluminum (Al) foil, stainless steel (SUS) foil, nickel (Ni) foil, titanium (Ti)

foil, and copper (Cu) foil. For example, the metal foil may be plated. For example, the SUS foil may be plated with Ni. The exterior body 210 may include at least one type selected from the group consisting of Al foil and Al foil laminate film, for example.

The first unit 251 is prepared by forming the positive electrode layer 10 on one surface of one exterior body 210. The positive electrode layer 10 contains a positive-electrode active material. The positive-electrode active material may include, for example, lithium nickel cobalt manganate and lithium iron phosphate. The positive electrode layer 10 may further contain, for example, a conductive material, binder, solid electrolyte, etc.

The negative electrode layer 20 is formed on one surface of the other exterior body 210. The negative electrode layer 20 contains a negative-electrode active material. The negative-electrode active material may include, for example, graphite, silicon, silicon oxide, etc. The negative electrode layer 20 may further contain, for example, a conductive material, binder, solid electrolyte, etc. The third unit 253 is prepared by attaching the separator 30 to one surface of the negative electrode layer 20. The separator 30 may include, for example, a porous film. The porous film may contain, for example, polyolefins, etc. The separator 30 may include, for example, a solid electrolyte layer.

The partition 230 is in the form of a sheet. The partition 230 may be formed of the same material as the exterior body 210 or may be formed of a different material than the exterior body 210. The partition 230 may function as a current collector. The partition 230 may include, for example, metal foil. The partition 230 may include, for example, Al foil, etc. The positive electrode layer 10 is formed on one surface of the partition 230. The negative electrode layer 20 is formed on the surface opposite to the surface on which the positive electrode layer 10 is formed. The positive electrode layer 10, partition 230 and negative electrode layer 20 are combined to form a bipolar electrode. In the bipolar electrode, the separator 30 is attached to one surface of the negative electrode layer 20, so that the second unit 252 is prepared.

Figure 7:
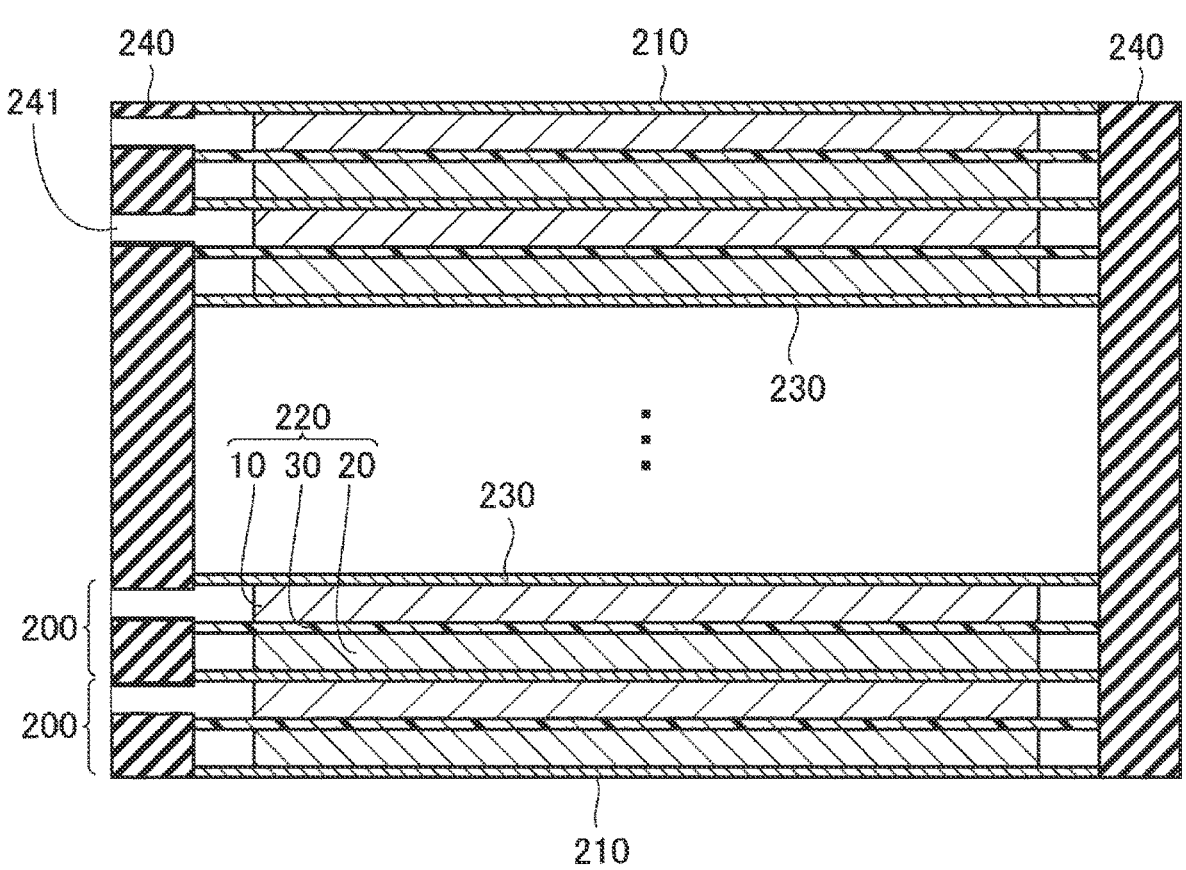
FIG. 7 is a schematic cross-sectional view of a bipolar cell module in the embodiment.
Figure 7:
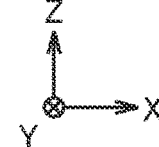

FIG. 7 is a schematic cross-sectional view of the bipolar cell module in this embodiment. The first unit 251, second unit 252, . . . , second unit 252, and third unit 253 are stacked together to form the cell module 250. A set of the positive electrode layer 10, separator 30, and negative electrode layer 20 form the power generating element 220. The power generating element 220 is sandwiched by two partitions 230, so that the cell 200 is formed. At the opposite ends in the stacking direction, the power generating element 220 is sandwiched between the partition 230 and the exterior body 210, so that the cell 200 is formed. Each of the cells 200 independently includes an internal space.

The exterior body 210 includes a sealing material 240. For example, the sealing material 240 may be located so as to fill the periphery of the power generating elements 220. The sealing material 240 may contain, for example, thermoplastic resin (such as PP). The injection ports 241 may be formed in a part of the sealing material 240. Namely, the injection ports 241 may be formed in the exterior body 210. The injection port 241 is a hole that can provide a liquid channel and a gas channel. The electrolyte may be injected into each cell 200 through the injection port 241. Namely, the electrolyte may be injected into the exterior body 210 through the injection port 241.

Figure 8:
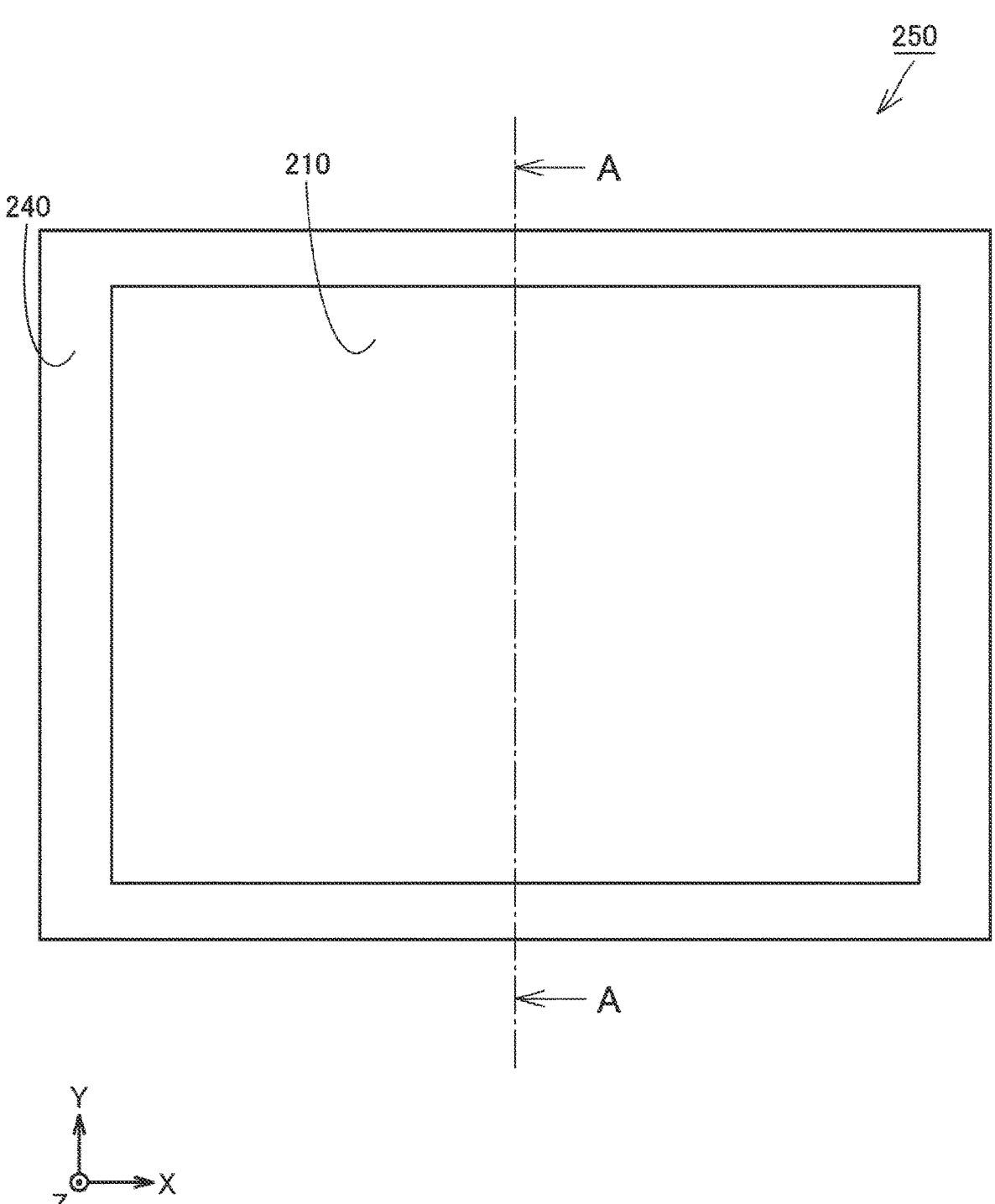
FIG. 8 is a schematic top view of the bipolar cell module in the embodiment.

FIG. 8 is a schematic top view of the bipolar cell module in this embodiment. The planar shape of the cell module 250 may be selected as desired. The planar shape of the cell module 250 may be, for example, a rectangular shape. The sealing material 240 can be located so as to surround the perimeter of the exterior body 210. FIG. 7 is a cross-sectional view taken along line A-A in FIG. 8.

For example, a monopolar cell module may be prepared as the workpiece 201. For example, the partition 230 may consist of two or more sheet-like members. In this case, the positive electrode layer 10 is formed on one surface of one of the sheet-like members of the partition 230. The negative electrode layer 20 is formed on one surface of the other sheet-like member of the partition 230. The monopolar cell is formed by superposing the one sheet-like member on the other sheet-like member so that the positive electrode layer 10 and the negative electrode layer 20 are opposed to each other. Between adjacent monopolar cells, the surface opposite to the surface on which the positive electrode layer 10 of the one sheet-like member included in one cell is formed is superposed on the surface opposite to the surface on which the negative electrode layer 20 of the other sheet-like member included in the other cell is formed, so that the monopolar cell module is formed.

(c) Placement of Workpiece

The manufacturing method includes placing the workpiece 201 in the chamber 110. For example, the workpiece 201 into which the electrolyte has been injected can be placed in the chamber 110 (see FIG. 4).

(d) Connection to Return Pipe

The manufacturing method includes connecting the exterior body 210 and the first opening 141 (return pipe 140) (see FIG. 4). For example, the injection port 241 may be connected to the first opening 141. In the case of the cell module 250, separate return pipes 140 can be connected to the injection ports 241 of the respective cells 200. The exterior body 210 may be provided with a gas exhaust port (not shown), separately from the injection ports 241. The gas exhaust port can function as a gas channel.

(e) Pressure Reduction

The manufacturing method includes reducing the pressure in the chamber 110, thereby to reduce the pressure in the exterior body 210 via the return pipes 140 (see FIG. 4). The pressure in the chamber 110 can be reduced by the pressure reducing device 130. A pressure loss can be generated in the return pipe 140.

The completion of the pressure reduction may be determined by the value indicated by the pressure gauge 150, for example. When the value indicated by the pressure gauge 150 is equal to or lower than a reference value, for example, it may be determined that the target degree of pressure reduction has been reached. Namely, the pressure in the exterior body 210 may be reduced so that the value indicated by the pressure gauge 150 becomes equal to or lower than the reference value.

The completion of the pressure reduction may be determined by the flow meter 160, for example. When the integrated value of the measurement values of the flow meter 160 (the total amount of discharged gas) is equal to or larger than the reference value after the pressure reducing device 130 is stopped, for example, it may be determined that the target degree of pressure reduction has been reached. When the target degree of pressure reduction has not been reached, the pressure reducing device 130 can be started again.

The reference values of the pressure and the flow rate can be set as appropriate according to the target degree of pressure reduction, the shape of the conduit 143, etc. The target degree of pressure reduction may be, for example, 5 to 50 kPa.

(f) Sealing

The manufacturing method may include sealing the exterior body 210 under reduced pressure. Thus, the cell module 250 is sealed. The cell module 250 includes a plurality of cells 200. For example, in the chamber 110, the injection ports 241 may be sealed by the sealing devices 120. For example, heat pressing melts and solidifies the sealing material 240. The sealing material 240 can block the injection ports 241 (see FIG. 7). The injection ports 241 may be blocked outside the chamber 110, for example.

Experiment

In this experiment, the cell module 250 was prepared as the workpiece 201. The cell module 250 was of bipolar type. The cell module 250 included five cells 200.

EXAMPLE

In Example, the manufacturing apparatus 100 was used (see FIG. 4). Separate return pipes 140 were respectively connected to the five cells 200. The pressure in the chamber 110 was reduced, so that the pressure in the exterior body 210 was reduced via the return pipes 140. The exterior body 210 was sealed at the target degree of pressure reduction. Whether the target degree of pressure reduction has been reached was determined by using both the pressure gauges 150 and the flow meters 160.

COMPARATIVE EXAMPLES

Figure 9:
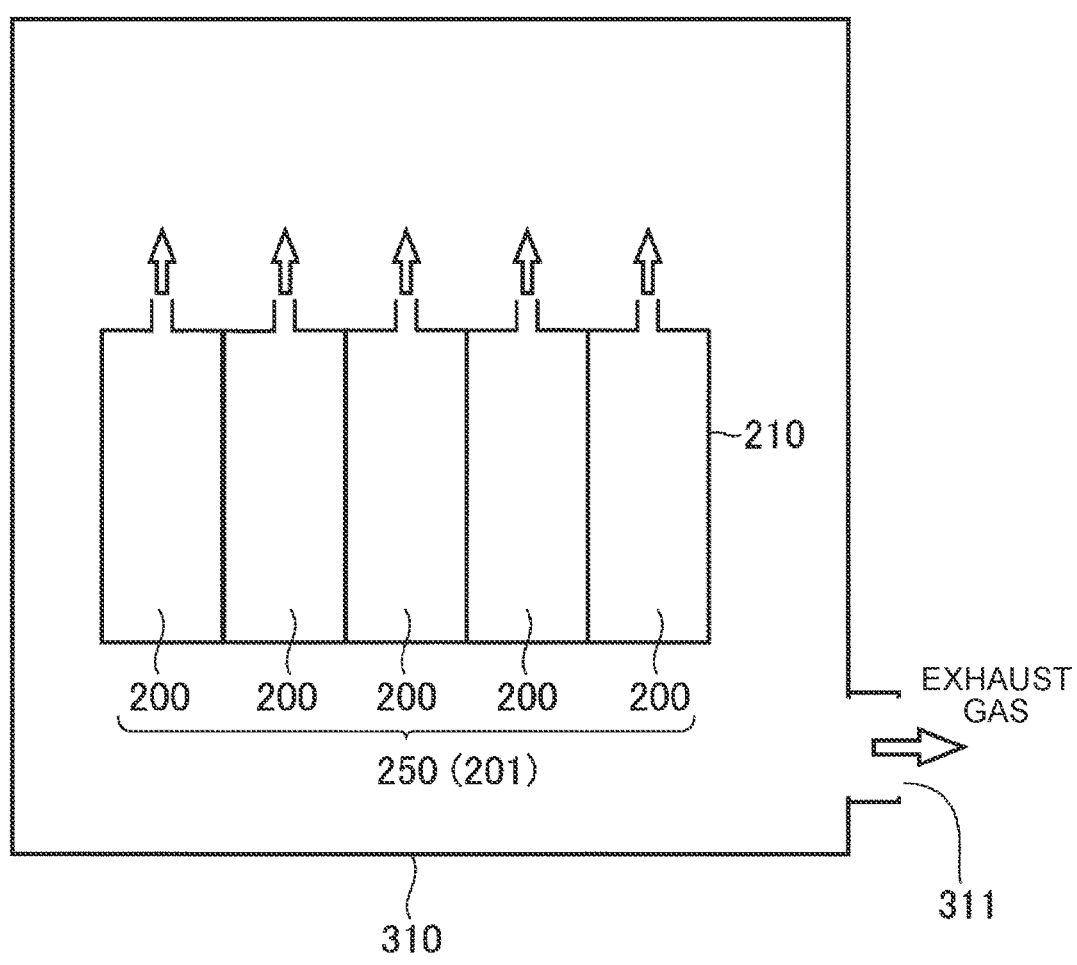
FIG. 9 is a conceptual diagram showing Comparative Example.

FIG. 9 is a conceptual diagram showing Comparative Example. In Comparative Example, the cell module 250 was placed in a chamber 310. The pressure in the chamber 310 was reduced, so that the pressure in the exterior body 210 was reduced. As the pressure in the chamber 310 was reduced, the pressures in the five cells 200 were reduced all together. After the pressure reduction, the exterior body 210 was sealed. The required time of pressure reduction was the same as that of Example. For example, another pressure gauge may be provided at an exhaust port 311 of the chamber 310, and whether the target degree of pressure reduction has been reached may be determined by use of the pressure gauge.

Evaluation

For each of the five cells 200, the presence or absence of blockage of a gas channel was visually checked. When a bulge due to residual air was observed in any of the cells 200, blockage of a gas channel was considered to have occurred. When no bulge due to residual air was observed in the cells 200, it was considered that no blockage of a gas channel occurred.

In Example, blockage of a gas channel was not observed. In Example, the internal pressure is considered to be guaranteed with respect to all of the cells.

In Comparative Example, blockage of the gas channel was observed. In Comparative Example, the internal pressure is not considered to be guaranteed with respect to all of the cells.

The embodiment and Example are exemplary in all respects. The embodiment and Example are not restrictive. The technical scope of this disclosure encompasses all modifications within the meaning and scope of the claims and equivalents. For example, it is expected from the outset to extract any configurations from the embodiment and Example, and arbitrarily combine the configurations.

What is claimed is:

1. A manufacturing apparatus for manufacturing an electrochemical cell having an exterior body under reduced pressure, the manufacturing apparatus comprising:
   a chamber;
   a pressure reducing device; and
   a return pipe, wherein
   the pressure reducing device is configured to reduce a pressure in the chamber,
   the return pipe includes a first opening, a conduit, and a second opening,
   the first opening and the second opening are respectively and independently open to an interior of the chamber,
   the first opening is configured to be connected to the exterior body,
   the conduit connects the first opening and the second opening,
   the conduit is configured to once draw a gas in the exterior body out of the chamber when the pressure in the chamber is reduced, and then return the gas into the chamber,
   the return pipe comprises a plurality of return pipes that are independent of each other; and
   each of the return pipes includes the first opening, the conduit, and the second opening.

2. The manufacturing apparatus according to claim 1, further comprising a pressure gauge,
   wherein the pressure gauge is connected to the conduit.

3. The manufacturing apparatus according to claim 1, further comprising a flow meter,
   wherein the flow meter is connected to the conduit.

4. The manufacturing apparatus according to claim 1, further comprising a sealing device,
   wherein the sealing device is configured to seal the exterior body in the chamber.

5. The manufacturing apparatus according to claim 1, wherein the return pipe is configured to withstand an external pressure during a pressure reduction.

6. The manufacturing apparatus according to claim 1, wherein the first opening is disposed at one end of the conduit and the second opening is disposed at a second end of the conduit.

7. The manufacturing apparatus according to claim 1, wherein the gas is configured to be sucked from the first opening and released into an interior of the chamber through the second opening when the pressure in the chamber is reduced.

8. The manufacturing apparatus according to claim 1, wherein an inside diameter of the conduit is 1 mm or more and 10 mm or less.

9. The manufacturing apparatus according to claim 8, wherein the diameter of the conduit is constant throughout a length of the conduit.

10. The manufacturing apparatus according to claim 8, wherein the diameter of the conduit varies throughout the length of the conduit.

11. The manufacturing apparatus according to claim 1, wherein the conduit comprises a plurality of elbows.

* * * * *